July 10, 1956 W. S. PERCIVAL ET AL 2,754,482

BAND-PASS CIRCUIT ARRANGEMENTS

Filed Jan. 24, 1950

INVENTORS:
WILLIAM SPENCER PERCIVAL
ERIC LAWRENCE CASLING WHITE
ERIC McPHAIL LEYTON
By Ralph E. Atherton
Attorney United States Patent Office 2,754,482
Patented July 10, 1956

2,754,482

BAND-PASS CIRCUIT ARRANGEMENTS

William Spencer Percival, Ealing, London, Eric Lawrence Casling White, Iver, and Eric McPhail Leyton, London, England, assignors to Electric & Musical Industries Limited, Hayes, England, a British company Application January 24, 1950, Serial No. 140,218

Claims priority, application Great Britain January 29, 1949

3 Claims. (Cl. 333—73)

This invention relates to band-pass circuit arrangements.

Figure 1:
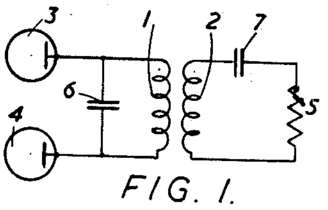

In Figure 1 of the accompanying drawing there is illustrated a coupling circuit arrangement which is theoretically suitable for transferring signals having a wide band of frequencies from a high impedance source, for example a pair of output valves operating in push-pull, to a low impedance load, for example an aerial feeder. The circuit comprises inductively coupled primary and secondary inductances 1 and 2 the opposite ends of the primary inductance being connected to the anodes of the output valves 3 and 4. The condenser 6 in parallel with the inductance 1 represents the total anode-to-earth capacities of the valves 3 and 4 in series, plus stray capacities, the inductance 1 and condenser 6 being tuned to parallel resonance in the pass band of the circuit. A condenser 7 is connected as shown in series with the inductance 2, the inductance 2 and condenser 7 being tuned to series resonance in the pass band of the circuit. The opposite ends of the series circuit 2, 7 are connected to the load which is represented as a resistance 5 equal to the characteristic impedance of the feeder.

In practice, however, the circuit illustrated in Figure 1 has certain disadvantages, one of which is that the self-capacity of the inductance 2 is not negligible compared with the condenser 7 and as a result the inductance 2 is partly series tuned by the condenser 7 and partly parallel tuned by its self-capacity with undesirable effects on the response of the circuit.

The object of the present invention is to provide an improved band-pass circuit arrangement, mainly with a view to reducing or overcoming disadvantages associated with circuits of the form illustrated in Figure 1.

According to the present invention there is provided a high frequency bandpass circuit arrangement comprising a balanced push-pull source of electrical oscillations occupying a band of frequencies, an asymmetric load including a coaxial transmission line feeder, a parallel resonant circuit interposed between said source and said load and including an inductance fed with balanced push-pull oscillations from said source, said inductance being constituted by the outer surface of an end portion of the outer conductor of said line and by the outer surface of a tubular conductor similar to said outer conductor portion, grounded means connecting the attached end of said outer conductor portion to the corresponding end of said tubular conductor, conductive means connecting the other end of said tubular conductor to the end of the inner conductor of said line adjacent said end portion of the outer conductor of said line, and means artificially increasing the capacity between said inner conductor and said end portion of the outer conductor to constitute the tuning capacity of said parallel resonant circuit.

Figure 2:
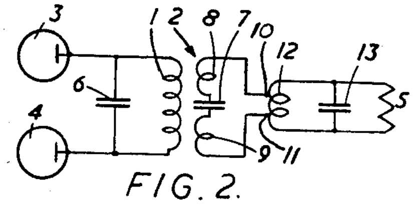
Figure 3:
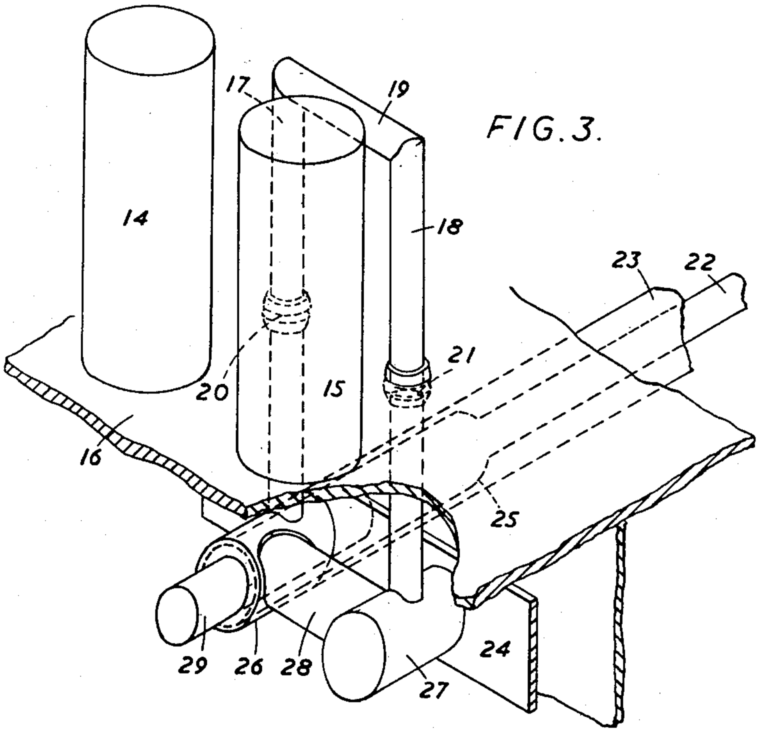

In order that the said invention may be clearly understood and readily carried into effect the same will now be more fully described with reference to Figures 2 and 3 of the accompanying drawings, in which:

Figure 2 illustrates diagrammatically, using conventional symbols for lumped components, a band-pass circuit arrangement according to one example of the present invention, and Figure 3 illustrates diagrammatically in perspective view an actual physical construction of the circuit arrangement illustrated in Figure 2, intended for use in a television transmitter.

Components in Figure 2 which corresponds to components already described in Figure 1 are denoted by the same reference numerals. Referring to Figure 2, the primary circuit of the arrangement shown therein is the same as that shown in Figure 1 and comprises the inductance 1 connected to the anodes of the valves 3 and 4 and tuned to parallel resonance by the capacity 6. The valves 1 and 2 are push-pull driven valves, the input connections not being illustrated since they may be of conventional form. In the secondary circuit which is tuned to the same frequency as the primary, the inductance 2 however, is divided into two equal parts 8 and 9 and the condenser 7 is interposed between the parts 8 and 9. The ends of the inductance 2 are moreover connected to taps 10 and 11 on a further inductance 12, which together with a condenser 13, which may consist partly of stray capacity, forms a tertiary parallel circuit tuned to the same frequency as the primary and the secondary circuits. The inductance 12 functions as an autotransformer coupling the secondary circuit to the tertiary circuit so that, in addition to the inductance 2 which couples the secondary circuit with the primary circuit, the secondary circuit includes that part of the inductance 12 between the taps 10 and 11, whereby the secondary circuit is coupled to the tertiary circuit. The output load 5 is connected across the parallel tuned circuit 12, 13.

With the arrangement shown in Figure 2, the self-capacity of the inductance 2 is partly in parallel with the condenser 7 and partly in parallel with the part of the inductance 12 between the taps 10 and 11. The part of the self-capacity in parallel with the condenser 7 merely adds to the effective capacity of this condenser, whereas the part in parallel with the inductance 12 merely adds to the effective capacity of the condenser 13 and in neither case has any harmful effect, compensation being simply achieved by a suitable choice of the condensers 7 and 13. Residual self-capacity existing between the ends of the respective parts 8 and 9 of the inductance 2, effectively in parallel with said parts, has a greatly reduced harmful effect compared with Figure 1, since the inductance of each of the parts 8 and 9 is small compared with the total inductance in the secondary circuit and the self-capacity in parallel with each of the parts 8 and 9 is small compared with the series tuning capacity in the secondary circuit. By tapping the inductance 2 down the inductance 12 the impedance of the load 5 as effectively transferred into the secondary circuit is reduced. For example if the load 5 has an actual impedance of about 50 ohms, the transformation may be such as to cause the load to appear to the secondary circuit as an impedance of about 15 ohms. The voltage step down required to be introduced by the transformer 1, 2 for the purpose of matching the impedance of the source, namely the anode impedance of the valves 3 and 4, to the impedance of the load is therefore greater than if the actual impedance of the load 5 appeared in the secondary circuit. The required value of the inductance 2 is consequently reduced $S^2$ times assuming that the value of 1 is unchanged while the required value of the condenser 7 is increased by $S^2$ times, where S is the voltage step-up of the inductance 12 from the taps 10 and 11 thereon. The reduction in the value of the inductance 2 causes the influence of stray capacity in the secondary circuit to be reduced. Moreover, the increase in the value of the condenser 7 reduces the ratio of the self-capacity of the inductance 2 to the capacity of the condenser 7, so that in this way the influence of stray capacity is further reduced.

The employment of the parallel resonant circuit 12, 13 has the additional advantage of enabling a higher impedance to be presented to the valves 3 and 4 than with the arrangement of Figure 1 over a comparable pass band, or of enabling a wider pass band to be obtained for a given impedance presented to the valves 3 and 4. It also enables a sharper cut-off to be obtained. The circuit 12, 13 introduces the further advantage of causing greater harmonic attenuation to take place, and it can also be utilised to improve the balance of the circuit so that balance can be maintained throughout the circuit from the valves 3 and 4 to an unbalanced load circuit, such as an aerial feeder. A practical application of the circuit illustrated in Figure 2 is illustrated in Figure 3.

Referring to Figure 3 the inductance 1 comprises the anode tubes 14 and 15 of the valves 3 and 4 which in the present use are water cooled power amplifying triode valves. The valves themselves are not shown but it will be understood that the anodes will be disposed within the tubes 14 and 15 which comprise water jackets for the valves. The tubes 14 and 15 are connected together by a conductive plate 16 which forms a ground plane. The inductance 2 is formed by parallel vertical limbs 17 and 18 interconnected by a horizontal limb 19, but instead of providing the series tuning condenser 7 at the mid-point of the inductance 2 two separate condensers are provided of twice the capacity which the condenser 7 would require to have and these are inserted at positions ¼ and ¾ of the length of the inductance 2 from one end thereof. These wto condensers are indicated at 20 and 21 and they are supported by insulators fixed to the plate 16, the limbs 17 and 18 of the inductance 2 being continued at the underside of the plate. The aerial feeder, represented in Figure 2 by the resistance 5 is constituted by inner and outer co-axial conductors 22 and 23, projecting through a conductive plate 24, the inner conductor having a part 25 of enlarged diameter at the end of the feeder which projects to the front of the plate 24 as seen in the drawing. The inductance 12 of Figure 2 comprises the portion 26 of the outer conductor 23 which projects to the front of the plate 24, a short conductive limb 27 constituting a dummy feeder electrically connected to the portion 26 by the plate 24, and a conductive cross member 28 which extends from the dummy feeder 27 through a slot or circular hole in the portion 26 of the outer conductor to the inner conductor 22, to which the member 28 is electrically connected. In this way balanced signals set up across the inductance are applied to the unbalanced circuit constituted by the inner and outer conductors 22 and 23. As shown in the drawing the parts of the limbs 17 and 18 of the inductance 2 which project below the plate 16 are electrically connected respectively to the parts 26 and 27 of the inductance 12 at positions corresponding to the taps 10 and 11 in Figure 2. The condenser 13 is partly constituted by a plunger 29, which projects as shown into the inner conductor, and by the adjacent inner surface of the enlarged part 23 of the inner conductor 22, the plunger being electrically connected to the end of the portion 26 of the outer conductor. The distance which the plunger 29 projects in the inner conductor 22 is adjustable to allow adjustment of the capacity of condenser 13. The remainder of the condenser 13 is formed by the capacity between the enlarged portion 25 of the inner conductor and the outer conductor 23.

The employment of the two condensers 20 and 21 instead of the single condenser 7 illustrated in Figure 2, has the advantages that the insulators supporting the condensers can be conveniently supported by the plate 16 and that the horizontal limb 19 of the inductance 2 remains almost at earth potential when the circuit is operating, whereas when a capacity such as 7 is inserted at the mid-point of the inductance 2, the two halves thereof would be at high and opposite potentials thereby increasing the effective capacitive coupling between the inductances 1 and 2. The effect of the self-capacity of the part of the inductance 2 between the condensers 20 and 21 can be neglected.

While the invention has been described as applied to a band pass circuit arrangement for feeding an output load, it will be understood that the invention can also be applied to inter-stage coupling circuits, in, say, wide-band high frequency amplifiers. In such an application the condenser 6 comprises the effective output capacity of the driving stage, while the condenser 13 is wholly or partly formed by the input capacity of the stage which is driven. The resistance 5 may consist of the control electrode damping of the driven stage, together with any additional shunt resistance which may be required or alternatively if the driven stage is a grounded grid stage the resistance 5 may consist of the cathode-to-control electrode input impedance of the stage.

Instead of coupling the secondary and tertiary circuits in the manner shown in Figure 2, mutual inductance coupling by means of a transformer may of course be employed.

What we claim is:

1. A high frequency band-pass circuit arrangement comprising a balanced push-pull source of electrical oscillations occupying a band of frequencies, an asymmetric load including a coaxial transmission line feeder, a parallel resonant circuit interposed between said source and said load and including an inductance fed with balanced push-pull oscillations from said source, said inductance being constituted by the outer surface of an end portion of the outer conductor of said line and by the outer surface of a tubular conductor similar to said outer conductor portion, grounded means connecting the attached end of said outer conductor portion to the corresponding end of said tubular conductor, conductive means connecting the other end of said tubular conductor to the end of the inner conductor of said line adjacent said end portion of the outer conductor of said line, and means artificially increasing the capacity between said inner conductor and said end portion of the outer conductor to constitute the tuning capacity of said parallel resonant circuit.

2. An arrangement according to claim 1, comprising a series tuned circuit, means including coupling inductance in said series tuned circuit providing voltage step-down coupling from said source to said series tuned circuit, said coupling inductance comprising parallel elongated members interconnected at one end and connected at their other ends respectively to said end portion of the outer conductor of said line and to said tubular conductor to provide a voltage step-up coupling between said series tuned circuit and said parallel tuned circuit, whereby the impedance of the load as transferred to said series tuned circuit is reduced compared with the actual impedance of the load, and the voltage step-down from said source to said series tuned circuit being proportioned to said reduced impedance to reduce the inductance in said series tuned circuit.

3. An arrangement according to claim 2, comprising a tuning condenser in said series tuned circuit dividing said inductance into separate parts.

References Cited in the file of this patent

UNITED STATES PATENTS

| | | |
|---|---|---|
| 1,850,754 | Jones | Mar. 22, 1932 |
| 1,867,746 | Jacobs | July 19, 1932 |
| 2,237,415 | Dow et al. | Apr. 8, 1941 |
| 2,265,067 | Ellestad | Dec. 2, 1941 |
| 2,267,445 | Cork et al. | Dec. 23, 1941 |
| 2,462,903 | Romander | Mar. 1, 1949 |